(12) United States Patent
Bassler et al.

(10) Patent No.: US 7,540,822 B2
(45) Date of Patent: Jun. 2, 2009

(54) TOROIDAL GEARING

(75) Inventors: Jürgen Bassler, Winnenden (DE);
Steffen Henzler, Böbingen (DE)

(73) Assignee: Daimler AG, Stuttgart (DE)

( * ) Notice: Subject to any disclaimer, the term of this patent is extended or adjusted under 35 U.S.C. 154(b) by 681 days.

(21) Appl. No.: 11/210,259

(22) Filed: Aug. 23, 2005

(65) Prior Publication Data
US 2006/0014605 A1    Jan. 19, 2006

Related U.S. Application Data

(63) Continuation-in-part of application No. PCT/EP2004/000558, filed on Jan. 23, 2004.

(51) Int. Cl.
*F16H 61/30* (2006.01)
(52) U.S. Cl. .................... 476/2; 476/9; 476/10; 476/40
(58) Field of Classification Search .................. 476/40, 476/42, 70, 2, 9, 10; 477/37, 38
See application file for complete search history.

(56) References Cited

U.S. PATENT DOCUMENTS

| | | | |
|---|---|---|---|
| 6,960,151 B2 * | 11/2005 | Kawai et al. ................ | 476/40 |
| 6,991,580 B2 * | 1/2006 | Elser et al. .................. | 476/46 |
| 2002/0038579 A1 | 4/2002 | Ooyama | |

FOREIGN PATENT DOCUMENTS

| | | |
|---|---|---|
| DE | 44 44 952 C2 | 6/1995 |
| DE | 199 27 268 C2 | 1/2000 |
| DE | 102 22 176 A1 | 11/2001 |
| EP | 0 930 449 A1 | 7/1999 |
| EP | 0 985 850 A1 | 3/2000 |
| EP | 1 039 172 A2 | 9/2000 |
| WO | WO 94/01697 | 1/1994 |
| WO | WO 00/15978 | 3/2000 |
| WO | WO 02/44587 | 6/2002 |

OTHER PUBLICATIONS

Patent Abstracts of Japan, public. No. 2002295618 A.
Patent Abstracts of Japan, public. No. 2002286110 A.
Patent Abstracts of Japan, public. No. 2001074114 A.
Patent Abstracts of Japan, public. No. 08004870 A.

* cited by examiner

*Primary Examiner*—David M Fenstermacher
(74) *Attorney, Agent, or Firm*—Klaus J. Bach (57) ABSTRACT

In a toroidal transmission with a continuously variable power transmission ratio, which is adjustable by displacement of a power transmission roller arranged between toric disks along an axis X-X under the control of an adjusting unit including a hydraulic piston, the adjusting unit has a bush which serves on the one hand to seal off the working space and, at the same time, forms two slide surfaces one for the piston and another for the guide bush, all in a small support space pivotally supporting a support member for the power transmission roller.

25 Claims, 7 Drawing Sheets

TOROIDAL GEARING

This is a Continuation-In-Part Application of International Application PCT/EP2004/000558 filed Jan. 23, 2004 and claiming the priority of German application 103 08 496.7 filed Feb. 6, 2003.

BACKGROUND OF THE INVENTION

The invention relates to a toroidal transmission with a continuously variable transmission ratio which is adjustable by axial displacement of a power transmission roller supported between, and in engagement with, opposite toric disks.

DE 44 44 952 C2 discloses a toroidal transmission in which a driving torque is transmitted by means of rollers which are arranged between two toric disks and are in rolling contact with these disks. The rollers are mounted on a pivotal support member. With a view to adjusting the transmission ratio between the toric disks, the support member is mounted at two bearing locations such that it can be displaced in the direction of an axis X-X and can be pivoted about the axis X-X. The support member can be displaced with the roller in the direction of the axis X-X by means of an adjusting unit. The adjusting unit in this case includes a piston which is operatively connected to the support member. The piston has a piston surface to which a pressure medium can be applied from at least one working space. Further prior art is known from documents WO 00/15978, DE 199 27 268 C2, EP 0 985 850 A1, EP 0 930 449 A2, WO 02/44587 A1, JP 08 004 870 and WO 94/01697.

It is the object of the present to provide an improved toroidal transmission with regard to the integration of the working space in a support frame that is, to improve the sealing, to reduce the complexity of components, and to facilitate assembly.

SUMMARY OF THE INVENTION

In a toroidal transmission with a continuously variable power transmission ratio, which is adjustable by displacement of a power transmission roller arranged between toric disks along an axis X-X under the control of an adjusting unit including a hydraulic piston, the adjusting unit has a bush which serves on the one hand to seal off the working space and, at the same time, forms two slide surfaces one for the piston and another for the guide bush, all in a small support space pivotally supporting a support member for the power transmission roller.

In accordance with the invention a multifunctional bush. The bush has a first contact region with the piston. Furthermore, the bush has a recess, in the area of which a second contact region between the bush and the piston (or between the bush and parts which move with the piston, in particular a guide bush or a piston rod) is formed. The bush forms a boundary of the working space in the sub-region between the first and second contact regions.

According to the invention, the term contact area is to be understood as meaning a contact surface area between the piston which moves relative to the bush and the bush which performs sealing and/or guiding roles. The working space is delimited by the piston and the area of the bush between the contact areas. As a result of the configuration according to the invention, the bush can be of multifunctional design, namely it can delimit the working space and form a sealing or guide surface in the area of the first contact region and a sealing or guiding surface in the area of the second contact region. The working space is preferably formed between the piston and any parts which are fixedly connected to, and move with, the piston and the bush. Because the two contact regions on the bush are provided as a single component, it is possible to comply with manufacturing accuracy requirements for the two contact surfaces between piston and cover in a particularly simple way.

The bush is preferably supported with a sealing action with respect to the casing (transmission casing or hydraulic casing). The bush may, for example, be a casting, a forging or a formed sheet-metal part, which means that the bush is inexpensive to produce. Forming the functional surfaces by a bush, which is a separate component, allows properties such as material, production process, mechanical properties or material or surface treatment to be adapted to the functions of the bush and to have priorities which differ from the properties of adjacent parts, such as a casing.

In a particular embodiment, the bush forms a cover. A cover of this type can be inserted into a casing from the outside approximately in the direction of the roller and in particular, in addition to the functions mentioned above, also provides sealing for the pressure-medium region with respect to the outside.

In an alternative configuration, the bush is an insert, which can preferably be inserted into a casing in the direction of the roller. The piston is then arranged in the insert. A working space which is still open can then preferably be closed with respect to the outside by means of an additional cover. For both alternatives, the term "outside" may represent an outer region of the toroidal transmission or a region of the toroidal transmission other than the pressure-medium region.

In a preferred configuration the toroidal transmission has a hydraulic casing which is formed integrally with, or separately from, the transmission casing. The working space is arranged on the radially inner side of a recess of the hydraulic casing. In this case, the working space may be arranged axially within the hydraulic casing or may be mounted axially in front of it. In the simplest possible case, the adjusting unit with the at least one working space may therefore be surrounded by the single-part or multipart hydraulic casing and the bush. This results in a particularly simple design configuration which at the same time leads to high operating and assembly reliability.

According to a refinement of the toroidal gearing, the bush has a hollow-cylindrical collar. A cylindrical inner surface of the collar forms the first contact area, i.e. a sealing and/or guiding surface for the piston. According to this embodiment, the recess is a bore. A cylindrical outer surface of the collar can be inserted accurately into the bore. Accordingly, the collar is of multifunctional design, namely, on one hand, it forms a centering surface for the bush as a whole, and on the other hand, it serves as a contact region between bush and piston. This results in a particularly simple and operationally reliable toroidal transmission arrangement.

In a preferred embodiment of the toroidal transmission, the collar has an approximately radially oriented passage, via which the pressure medium can be fed to at least one working space. The passage may in this case be hydraulically connected to a suitable annular groove, in particular in the hydraulic casing. A particularly simple supply of the pressure medium to the working space is ensured by means of the passage. If the passage is mounted in front of the first contact region in the direction of the axis X-X, it is possible to avoid the pressure medium being supplied in the contact region, with the result that no additional provisions for achieving a sealing action and/or for ensuring the guiding function are needed.

In the toroidal transmission, it is preferable for sealing elements to act between the bore in the hydraulic casing and the collar. The passage is arranged between the sealing elements. This allows secure transfer of the pressure medium from the hydraulic casing to the passage and therefore into the working space. The sealing elements are preferably sealing rings which are arranged in suitable grooves in the hydraulic casing and/or the bush.

In a refinement of the toroidal transmission according to the invention, the support member or at least a component connected to the latter extends through the bush. Accordingly, actuation of the adjusting unit causes the support member to be moved to the bush, with a sealing action being ensured by the abovementioned sealing elements. Areas of the support member which are arranged outside the bush are therefore accessible from the outside, that is from without the hydraulic casing and without the bush, with the result that (partial) adjustment, assembly and/or dismantling is possible. This adjustment, assembly and/or dismantling is possible without opening the working space so that no pressure medium can escape.

This configuration is particularly advantageous if the piston is fastened to the support member by means of a bolt which extends through a central bore in the piston and which, on the outer side of the bush, has a head that bears against the piston in an end region thereof, while, at the opposite end region, it is screwed to the support member. In this case, the connection between piston and support member can be released by loosening the screw connection without dismantling of the adjusting unit.

In a further embodiment of the toroidal transmission according to the invention the bush has a cylindrical inner surface. The cylindrical inner surface forms a contact surface for the radially outer surface of a bush which moves with the pistons or the piston. Accordingly, the bush performs sealing and guiding tasks for the abovementioned outer surface.

In cross-section, the bush is Z-shaped. The two parallel limbs of the Z form the first and second contact regions. The connecting area between the parallel limbs forms a boundary for the working space. In this case, the connecting area is preferably oriented parallel, or at an acute angle, to the associated piston surface. The Z-shaped design of the bush represents a particularly simple shape of the bush which has been optimized in terms of its weight and reduced to what is essential. A bush of this type can be produced easily and with low consumption of material, in particular from a metal sheet and/or by a stamping, cold-pressing or hot-pressing process. Furthermore, the Z-shaped design results in a particularly rigid bush design.

The installation position of the bush is preferably secured in the direction of the axis X-X by (at least) one lock ring. This represents a form of fixing the position of the bush which is particularly simple to produce and release and also secure.

The opposite active piston surfaces may be of approximately equal size. Then there is no need for complex compensation for the different force boosts during control of the pressure of in working spaces.

In a preferred embodiment of the toroidal transmission, the working spaces are substantially or exclusively delimited by the piston and an insert. In this case, the insert may have recesses or bores via which the pressure medium can be fed to the working spaces. The insert is in this case of particularly simple form. It comprises then a bush in accordance with the designs described above and a further bush. By way of example, the insert, as seen in partial cross section, is approximately "hat-shaped", in which case the top of the "hat" forms a slide surface for the piston, the side faces delimit the working spaces opposite the associated piston surfaces and the "brims" of the "hat" form sealing and guide surfaces for the piston, a piston rod or components which move with the piston. This creates a particularly inexpensive, functionally accurate unit, which is simple to assemble and produce, for forming the working spaces and for guiding the piston.

Preferably, the insert is formed by the bush in accordance with the designs described above and the further bush are welded to one another. As a result, the two bushes form a rigid unit which is simple to produce and reliably ensures that the working spaces are leak-tight.

In a further embodiment of the invention, the position of the bush (and if present of the further bush) with respect to the component fixed to the casing, or the casing is secured by a crimped-in or outwardly bent structure. A crimped-in or outwardly bent structure of this type is received in a positively locking manner in the component fixed to the casing or the casing directly. As a result, the position of the bush is secured with respect to axial displacements or rotations in the peripheral direction. Consequently, there is no need for an additional securing means. When the bush has been inserted into the casing, the outwardly bent structure can be produced by means of a suitable tool.

In a particularly advantageous embodiment of the invention, the bush has at least one recess, which is connected to passages for supplying a pressure medium to at least one pressure space. The recess preferably has a contour which acts as a throttle with respect to the passages. This is advantageous if the pressure medium is subject to undesirable pressure medium pressure fluctuations. Pressure fluctuations of this nature may be caused on the one hand by control phenomena for the pressure medium for adjusting the transmission ratio. On the other hand, it is also possible for the carrier to be subject to dynamic forces even in steady-state operation as a result of the contact conditions of one or more rollers with the toric disks, which leads to pressure medium pressure fluctuations. In situations of this nature, designing the recesses as a throttle effectively damps pressure medium pressure fluctuations, with the result that the stability with which the transmission ratio adjuster operates can be increased.

The fastening of the bush to the component fixed to the casing or to the casing can be (additionally) secured by a securing means, such as for example a bolt. In this case it is advantageous in particular if in the region of the abovementioned securing means a seal is arranged between securing means, bush and/or the component fixed to the casing or the casing. This makes it possible to reliably prevent the pressure medium from passing between the bush and casing, for example into the interior of the toroidal transmission.

According to a further embodiment of the invention, the further bush can be inserted under radial pre-stress into the component fixed to the casing or the casing. In this case, by way of example, it is possible to make use of the elasticity of the further bush. If the bush presses itself radially outward onto the component fixed to the casing or the casing as a result of the radial pre-stress, it is as a result possible to effect a sealing action as well as securing the axial position of the further bush, in particular without the need for a further sealing element.

According to a refinement of the toroidal gearing according to the invention, passages are at least partially cut into the component fixed to the casing or the casing by means of a cylindrical milling cutter. This measure represents a particularly simple way of producing the passages.

The invention will become more readily apparent from the following description of various embodiments thereof with reference to the accompanying drawings.

DESCRIPTION OF A PREFERRED EMBODIMENT

In a toroidal power transmission 10 according to the invention, a driving torque is transmitted between at least one pair of driving toric disks and an output toric disk by means of at least one pair of rollers 11 so as to provide for a continuously variable transmission ratio. In particular, the toroidal power transmission 10 is designed as a geared transmission having a multiplicity of power transmission paths.

Figure 1:
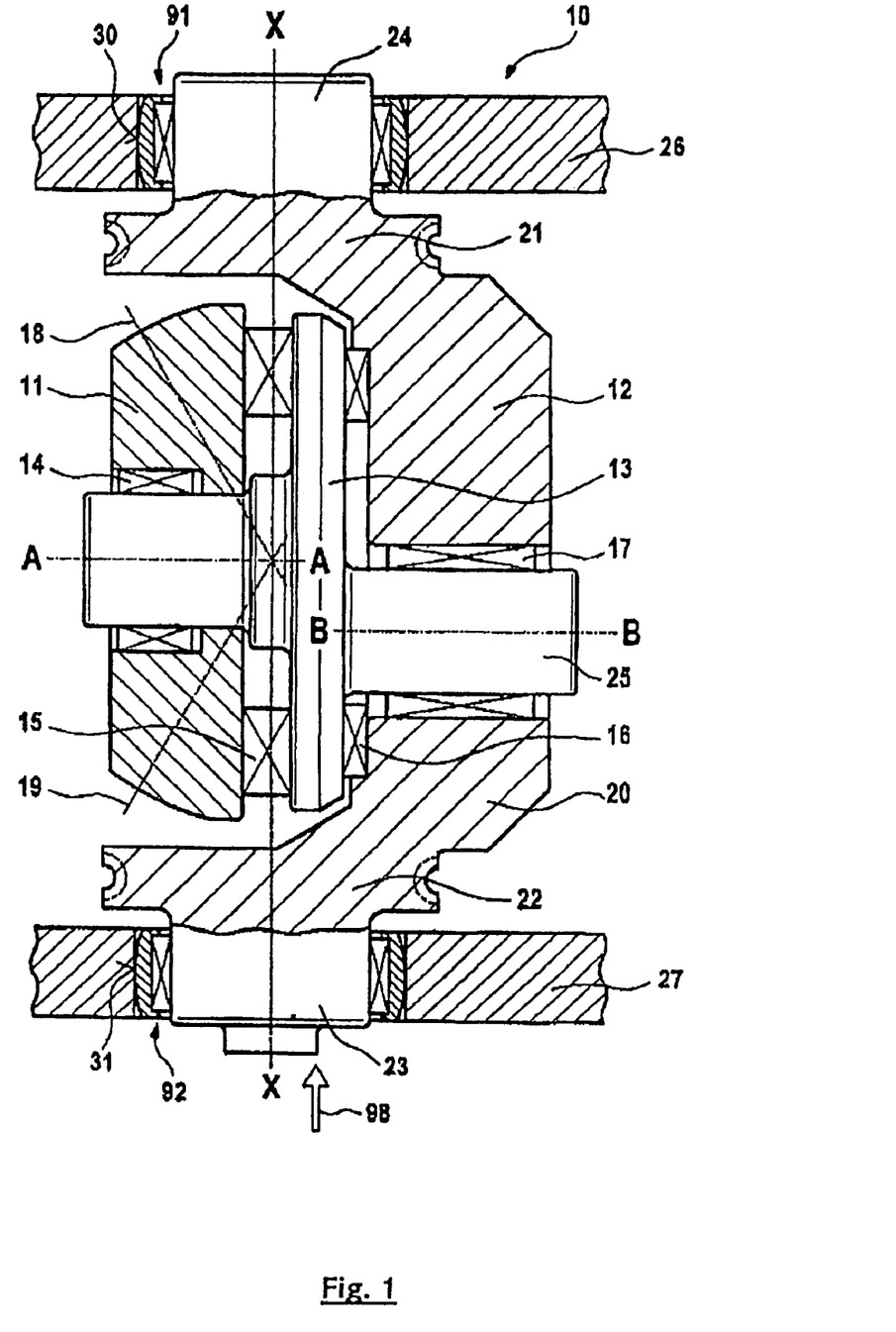
FIG. 1 is a partial sectional view of a toroidal transmission according to the invention.

The toroidal transmission 10 has support members 12, on each of which a roller 11 is supported. The roller 11 has a degree of rotational freedom about an axis A-A with respect to a carrier 13. The roller 11 is radially supported with respect to the carrier 13 by means of a roller bearing 14, in particular a needle bearing. Axially the roller 11 is supported in the direction of the axis A-A by way of a non-friction bearing 15, in particular a ball bearing. The carrier 13 is mounted with a degree of rotational freedom about the axis B-B with respect to the support member 12. The carrier 13 is axially supported in the direction of the axis B-B by way of a roller bearing 16, in particular a needle bearing. The carrier 13 is also radially supported with respect to the support member 12 by way of a roller bearing 17, in particular a needle bearing. The axes A-A and B-B are oriented parallel to one another and are arranged at a distance from one another, so as to provide an eccentric support arrangement. For details as to components of the toroidal transmission which are not shown, in particular for details of the interaction of the support structure 12 with adjacent components of the toroidal transmission and of the roller 11 with the toric disks, as well as components which are connected downstream in drive terms, reference is made, by way of example, to document DE 10206200 which is assigned to the assignee of the present application.

In the illustration of FIG. 1, the toric disks are oriented parallel to the plane of the drawing and are positioned one below and one above the plane of the drawing as indicated by a dashed circular line.

The support number 12 is mounted such that it can be displaced along an axis X-X. The axis X-X lies in the plane of the drawing shown in FIG. 1 and is oriented vertically with respect to the axes A-A and B-B. The axis X-X extends approximately through the intersection point of the surface normals 18, 19 of the rolling surface of the roller 11.

The support member 12 is of substantially U-shaped design, having a base 20 and two side legs 21, 22. The base 20 is oriented parallel to the axis X-X. The roller 11, the carrier 13 and the roller bearings 14-17 are arranged in the interior of the U-shaped cross section of the support member 12. The carrier 13 has a shaft 25, which, together with the rolling bearing 17 mounted on it, can be inserted into a bore in the base 20 of the support member 12 for bearing purposes. Bearing stubs 23, 24 arranged at the opposite side legs 21, 23 project away from one another along the longitudinal center axes which correspond to the axis X-X.

Two pivot levers 26, 27 are mounted centrally with respect to a carrier plate fixed to the casing such that they can pivot, via bearings, about parallel axes which are oriented perpendicular to the plane of the drawing, cf. document DE 102 06 200. In an end region, the pivot lever 26 has a bore 30, in which the bearing stub 24 is received, such that the pivot lever 26 can pivot about an axis vertical to the plane of the drawing. In the present case, the bearing location 91, which is designed as a pivotable receiving part, is realized by a ball body that is accommodated in a bore and is supported against the bearing stub 24 in the interior by way of roller bearings. The bearing stub 23 is received in a corresponding way in a bore 31 in the pivot lever 27 at a bearing location 92.

In a way corresponding to the support member 12 with roller 11 illustrated in FIG. 1, a further support member with another roller is supported oriented parallel thereto between the toric disks and is mounted in a corresponding way on the ends of the pivot levers 26, 27 opposite the bores 30, 31, of the bearings of the carrier structure with respect to the pivot levers 26, 27, see for example DE 102 06 200. The support member 12, the pivot lever 27, the further support member and the pivot levers 26, 27 approximately form a parallelogram, the angles of which can be altered according to the displacement of the support member 12 along the axis X-X.

The support member 12 with associated components can be acted upon by a force 98 by way of an adjusting unit 93, and the support member 12 can be displaced along the axis X-X according to this force 98 applied by the adjusting unit 93.

Figure 2:
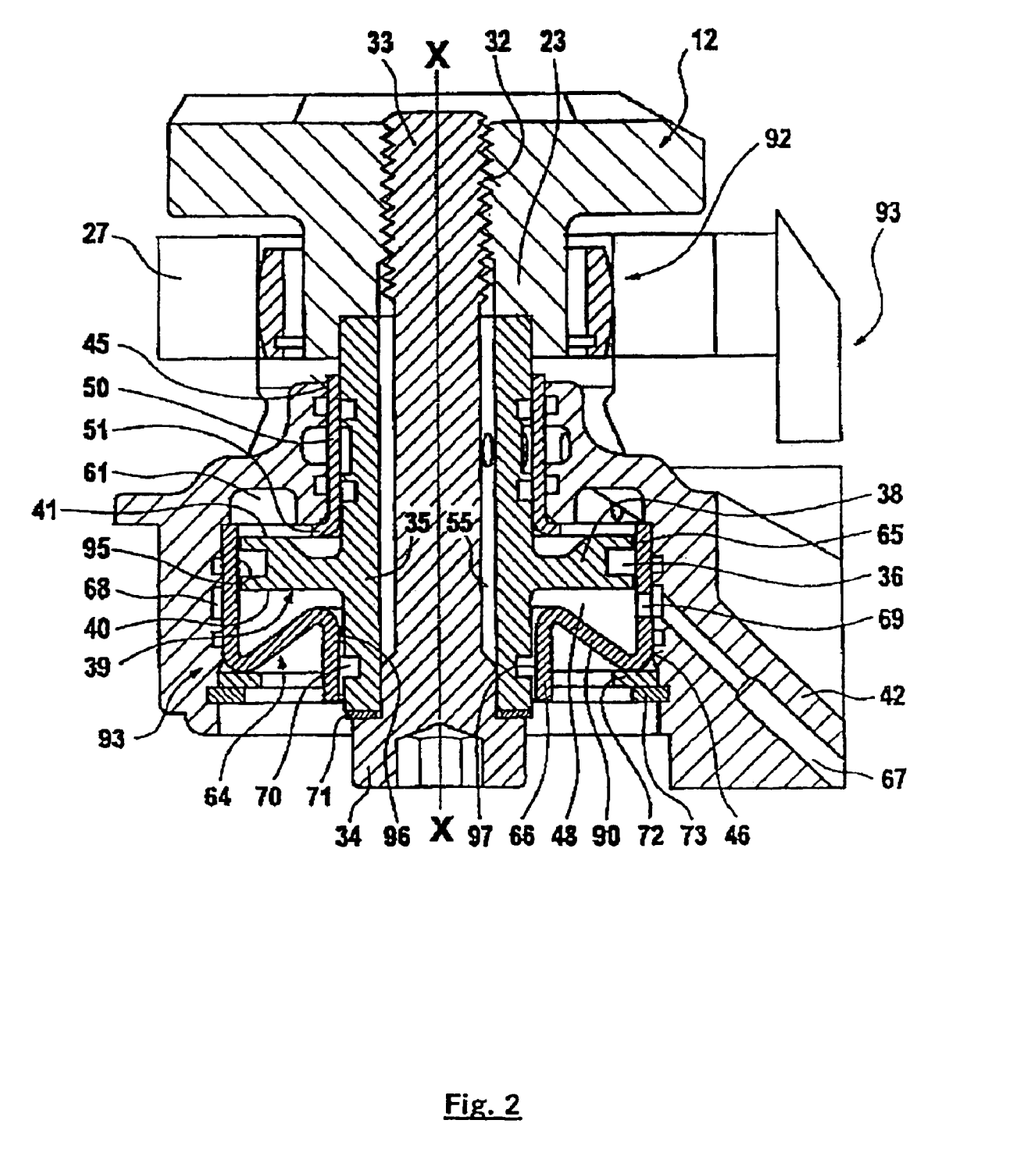
FIG. 2 is a partial sectional view of an adjusting unit of a toroidal transmission according to the invention.
Figure 3:
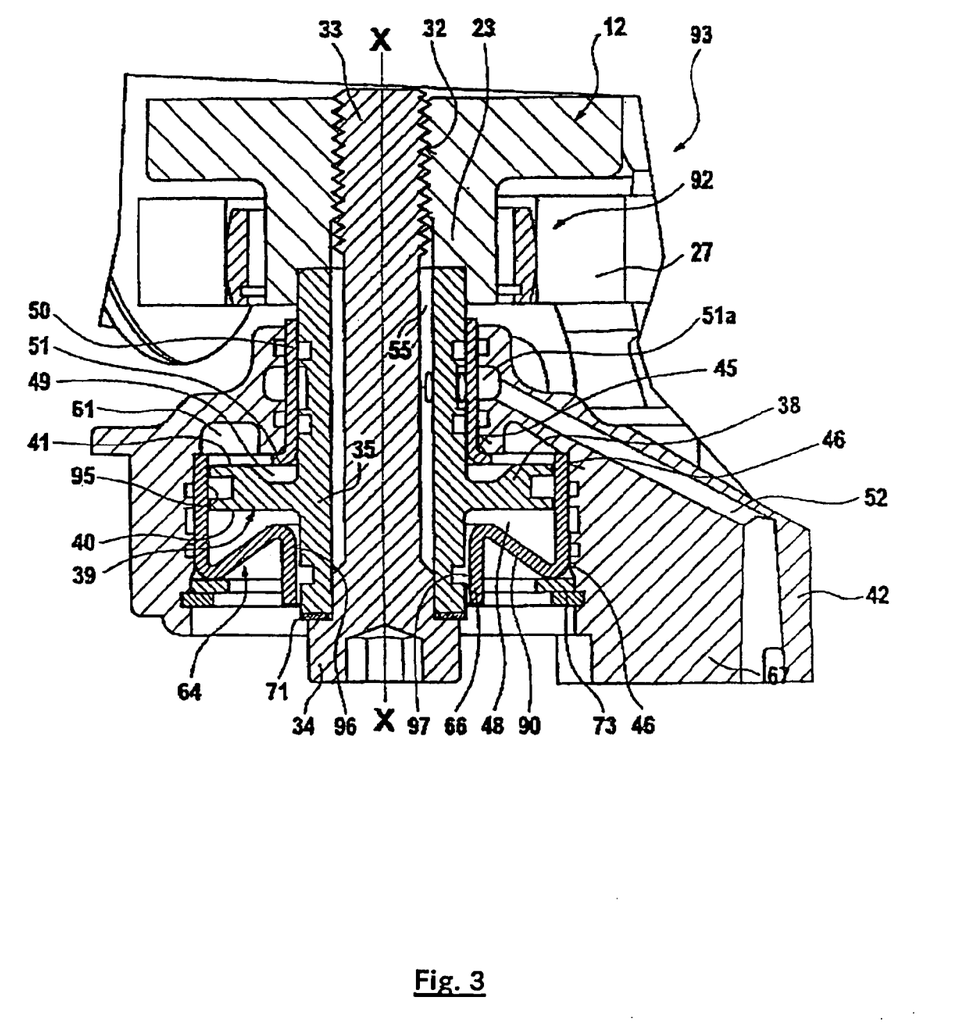
FIG. 3 is a partial sectional view of an adjusting unit as shown in FIG. 2 of a toroidal transmission according to the invention, with the section taken in a different direction.

In accordance with the exemplary embodiment illustrated in FIG. 2, the bearing stub 23 has a through-bore with an internal thread 32, into which a securing bolt 33 can be threaded coaxially with respect to the axis X-X for attachment of the adjusting unit 93. The securing bolt 33 has a head 34, by means of which a guide bush 35 can be clamped to the bearing stub 23 when the securing bolt 33 is tightened.

The guide bush 35, together with an annular body 38, forms a piston 39. The guide bush 35 (at least in load-bearing sections) surrounds a shank of the securing bolt 33 without any play. The annular body 38 has substantially parallel piston surfaces 40, 41 which have approximately the same effective surface area and are oriented transversely to the axis X-X. On the radially inner side, the annular body 38 is integrally connected to the guide bush 35. A circumferential groove 36 for receiving a sealing element, in particular a sealing ring, is formed into the radially outer lateral surface of the annular body 38. By way of example, a sealing unit corresponding to GB 2 373 034 B is used. The outer end face of the guide bush 35 bears against a mating surface of the head 34 in the assembled state.

A hydraulic casing 42 of single-piece or multi-piece design, in particular with a first hydraulic plate and a second hydraulic plate, is attached fixedly to the transmission casing. As an alternative to the embodiments illustrated, the hydraulic casing may be formed as an integral component of the transmission casing. Preferably, the hydraulic casing 42 is formed from aluminum or an aluminum alloy.

The hydraulic casing 42 has a bore 45 in which that part of the guide bush 35 which faces the roller 11 is accommodated, preferably with a sliding bush and/or sealing element fitted in between. On the side remote from the roller, the hydraulic casing 42 has a bore 46, the diameter of which is larger than that of the bore 45. The bore 46, if appropriate with a sliding bearing bush or the cover 64 together with the first contact region 95 and/or a sealing element fitted in between, forms a contact region of the piston 39 in the region of the radial outer lateral surface of the annular body 38. On the side remote from the roller 11, the bore 46 is closed off by a cover 64 which forms an opening 97 that receives the guide bush 35 or the securing bolt 33 or the head 34, if appropriate with a slide bearing bush and/or a sealing element fitted in between.

Figure 4:
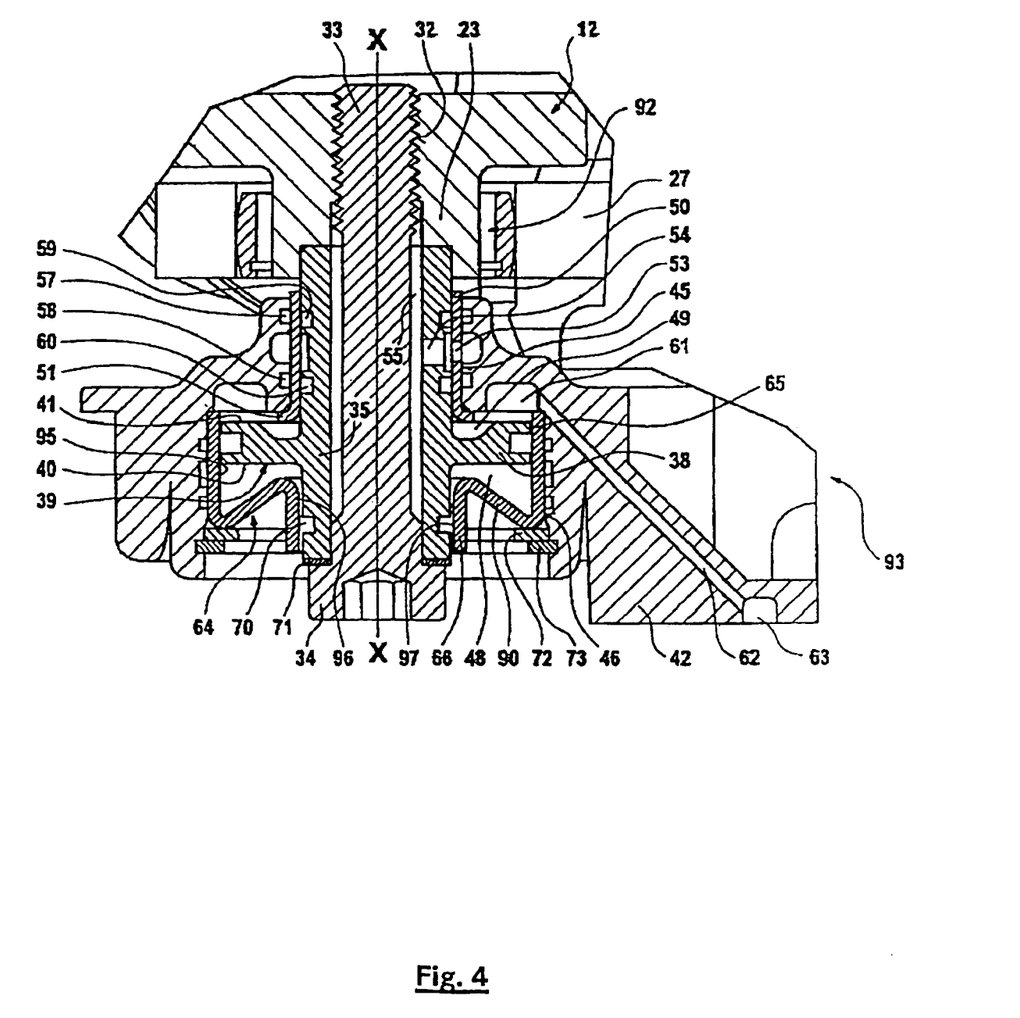
FIG. 4 is a partial sectional view of an adjusting unit as shown in FIG. 2 of a toroidal transmission according to the invention with the section taken in a different direction.

A slide bearing bush 50 is inserted into the bore 45 from the outside and is supported with respect to the hydraulic casing 42 by way of a shoulder 51. In the region of contact between the hydraulic casing 42 and the slide bearing bush 50, the hydraulic casing has an annular passage 51a, which can be supplied with a pressure medium, in particular a lubricant, via a passage 52 which extends through the hydraulic casing 42. An annular gap 55 between the guide bush 35 and the securing bolt 33 can be supplied with the pressure medium via a bore 53 (FIG. 4) in the sliding bearing bush 50 and a bore 54 which, in the installed state, is in hydraulic communication with the bore 53. The annular gap 55 is present in the axial regions in which the external diameter of the securing bolt 33 is smaller than the internal diameter of the guide bush 35. As an alternative or in addition, the securing bolt 33 may have a flattened section or internal bores or passages for guiding the pressure medium.

Figure 5:
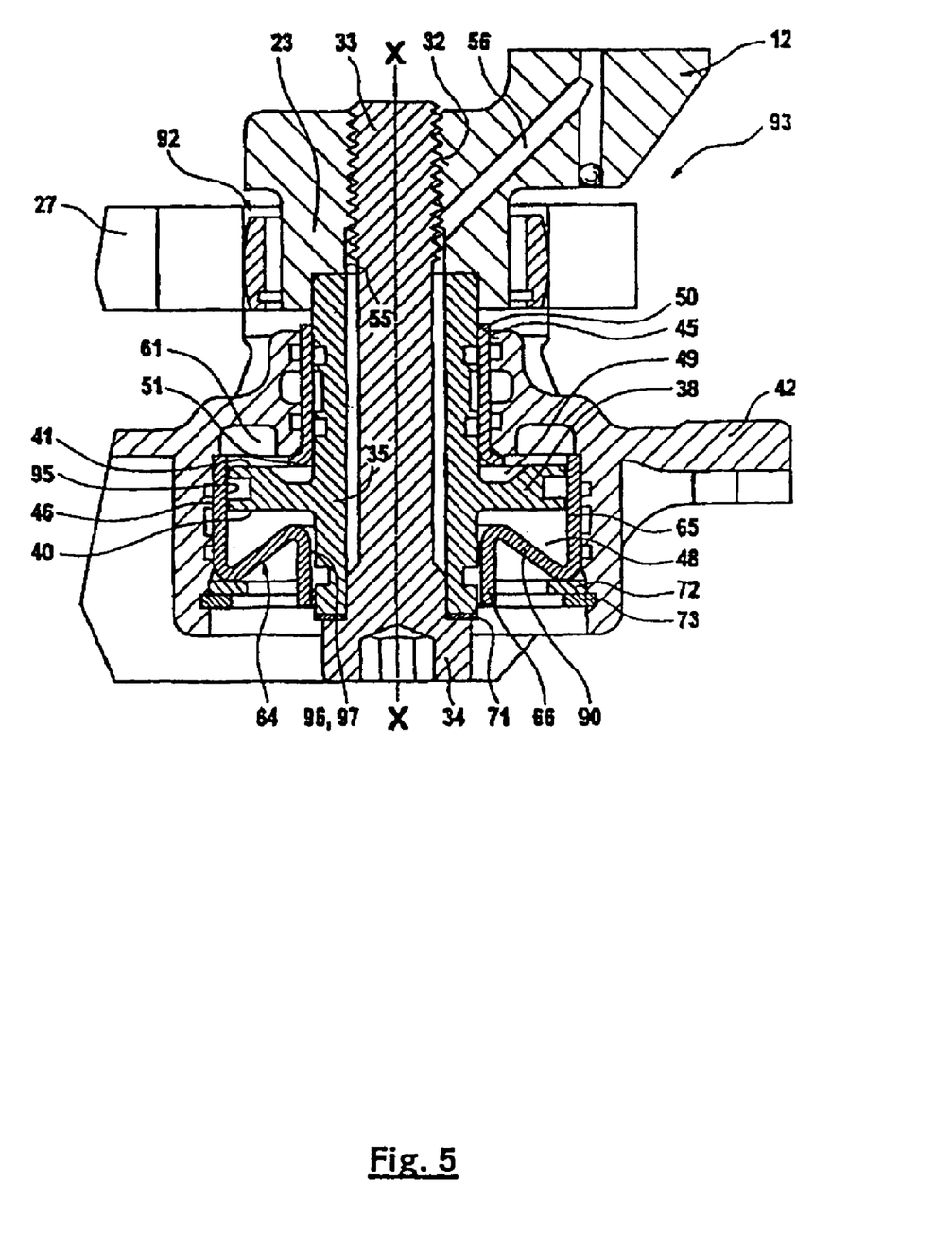
FIG. 5 is a partial sectional view of an adjusting unit as shown in FIG. 2 of a toroidal transmission according to the invention with the section taken in a different direction.

The annular gap 55 ensures that the pressure medium passes into a connecting passage 56 (FIG. 5), which extends through the support member 12 and ensures that the pressure medium is fed to the carrier 13, the rollers 11 and the roller bearings 14-17. A sealing element is mounted in front of, and behind, the bores 53, 54 in the direction of the axis X-X in the contact region between the slide bearing bush 50 and the hydraulic casing 42, on the one hand, and the guide bush 35, on the other hand. The sealing elements are preferably arranged in suitable circumferential grooves 57-60 (FIG. 6) which have been formed into the hydraulic casing 42, the slide bearing bush 50 and/or the guide bush 35.

The working space 49 is in hydraulic communication with an annular passage 61 formed into the end face of the bore 46. Fluid is supplied to the annular passage 61 from a connection bore 63 via a connecting passage 62, which extends through the hydraulic casing 42.

The cover 64 is inserted into the hydraulic casing 42. The cover 64 has a substantially Z-shaped half longitudinal cross-section and is formed rotationally-symmetrically with respect to the axis X-X. The parallel base sections 65, 66 of the Z-shaped longitudinal section are joined by a connecting leg 90. The radially outer base section 65 is inserted in a tightly fitting manner into the bore 46 in the hydraulic casing 42 from the outside, i.e. in the direction toward the roller 11. It is preferable for the base section 65 to adjoin the end face of the bore 46 or the annular passage 61. Via a connecting passage 67, the pressure medium can be fed to the working space 48 via an encircling annular passage 68 of the hydraulic casing 42 and a radial bore 69 which opens out into this annular passage 68. A sealing element is mounted in front of and behind the annular passage 68 in the direction of the axis X-X in the contact region between hydraulic casing 42 and the base section 65, which sealing element has preferably been inserted into a suitable annular groove in the hydraulic casing 42 and/or the base section 65.

On its inner side, the radially inner base section 66 forms a contact region 96 with the area of the guide bush 35 which is arranged on the side remote from the roller 11. It is preferable for the base limb 66, together with the said area of the guide bush 35, to form an annular gap which allows slight radial movement of the guide bush when the support member is displaced as a result of high loads being applied thereto. In this contact region, the guide bush has an annular groove 70 in which a sealing element is arranged, which sealing element seals the working space 48 during radial movements of the guide bush.

The outer base section 65 has a greater axial length than the inner base section 66. The base sections are offset in such a manner that the base section 65 projects further into the hydraulic casing 42 than the transition point between the base section 66 to the connecting leg 90. The guide bush 35 is held in a tightly fitting manner in a suitable bore in the support member 12. To form the annular gap 55, the securing bolt 33 has a reduced cross section at least in the region between the bore 54 and the connecting passage 56. The guide bush 35 bears in a tightly fitting manner against the lateral surface of the securing bolt 33 in the end region facing the head 34. A washer 71 is arranged between the end region of the guide bush 35 facing the head 34 and the facing end face of the head 34.

The position of the cover 64 in the direction of the axis X-X is secured by means of securing rings 72, 73. The securing rings are inserted, with different diameters, one behind the other in the axial direction into corresponding grooves in the hydraulic casing 42. The axially inner securing ring 72 bears against the transition region between the base section 65 and the connecting leg 90.

An area of the guide bush 35 which is arranged on that side of the annular body 38 which is remote from the roller 11, the cover 64 (in particular the connecting leg 90 and base section 65) and the piston surface 40 delimit a working space 48. An opposite working space 49 is delimited by another area of the lateral surface of the guide bush 35, the piston surface 41, the lateral surface of the bore 46 or a slide bearing bush which has been inserted into this and the end face of the bore 46.

In the connecting region between the guide bush 35 and the support member 12, further components can also be secured by way of the securing bolt 33, for example a hub of a coupling element which is used to synchronize the movements of a plurality of support members 12, or contact disks which improve the contact conditions, the accurate adjustability of the position of piston 39 and support member 12 and reduce the maximum displacement of the piston 39. As a result of the mechanical loading of the support member, the latter is slightly deformed, which leads to a displacement of the contact regions of the support member 12 with the guide bush 35 and any components fitted in between. To ensure a sealed annular gap 55, it may be advantageous to provide a sealing element and a suitable receiving space for the sealing element in this/these contact region(s). Preferably, the contact surfaces between support member 12, the piston 39 and/or the disk are curved, in order to compensate for angle differences during assembly or as a result of deformations under mechanical load, cf. also DE 199 27 268 C2.

The piston 39 and the working spaces 48, 49 are parts of an adjusting unit 93, on the basis of which the roller 11 and the support member 12 can be displaced along the axis X-X in order to adjust the transmission ratio. The piston 39 can be acted on via two working spaces 48, 49. Alternatively, it is also conceivable to provide only one working space, which works against an energy accumulator, in particular a spring.

The inner surface of the base section 65 forms a first contact region 95, which serves as a sealing and/or guiding surface for the radially outer lateral surface of the piston 39. The inner surface of the inner base section 66 forms a second contact region 96, which serves as a sealing and/or guide surface for the radially outer lateral surface of the guide bush 35. The inner surfaces of the cover 64, in particular of the inner base section 66, form a hollow-cylindrical opening 97 in the cover 64, through which the securing bolt 33 and part of the guide bush 35 extend. The outer lateral surface of the base limb 65 forms a contact region with the bore 46 of the hydraulic casing, in particular providing a supporting function, a sealing function and/or an introduction and centering function during assembly.

The securing bolt 33 has outer and/or inner functional surfaces, by means of which it can be loosened or tightened by means of a suitable tool. The functional surfaces are preferably designed as a hexagon socket.

Figure 6:
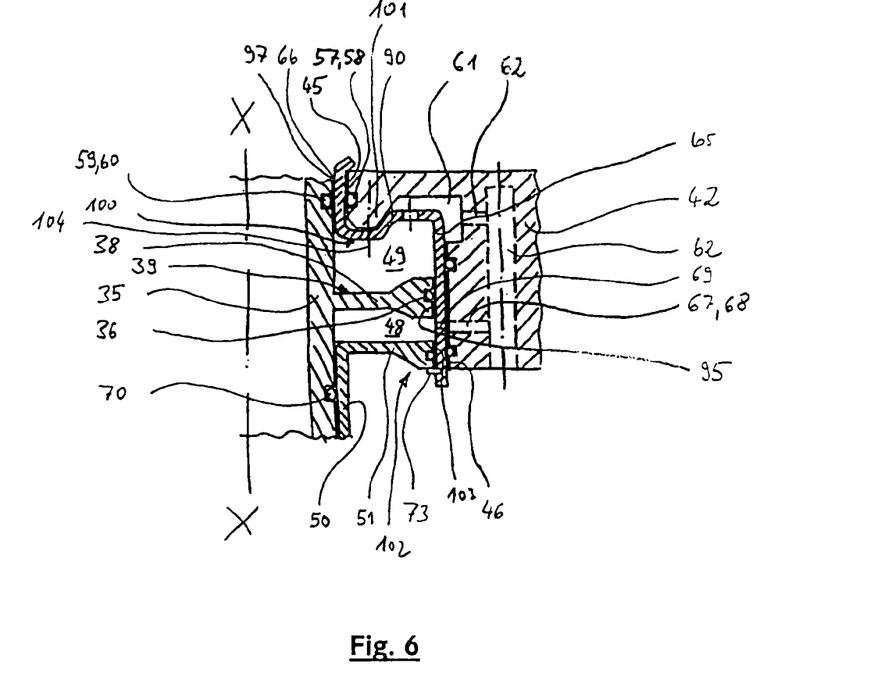
FIG. 6 is a partial sectional view of an adjusting unit in accordance with an alternative configuration of the toroidal transmission according to the invention.
Figure 7:
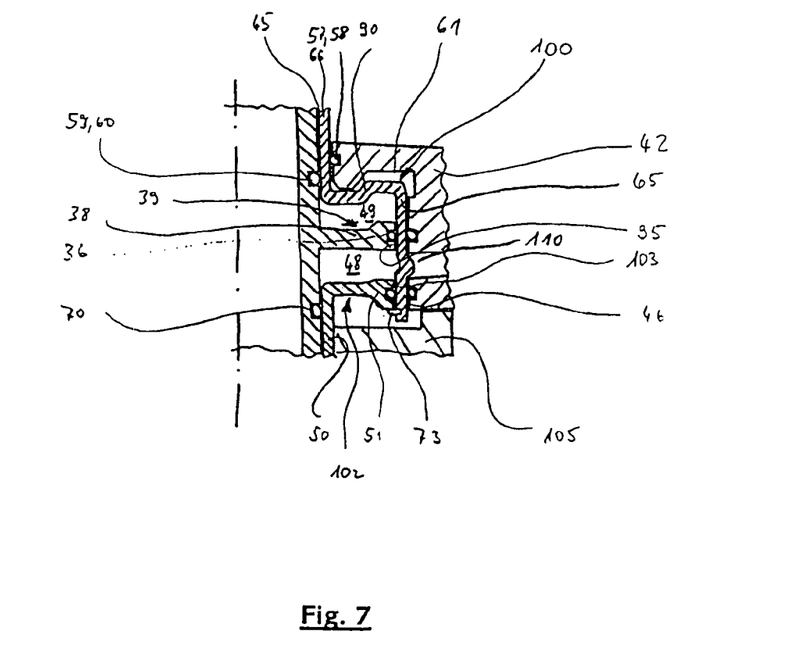
FIG. 7 is a partial sectional view of an adjusting unit in accordance with a further alternative configuration of the toroidal gearing according to the invention.

In accordance with the exemplary embodiments, illustrated in FIGS. 6 and 7—with an otherwise substantially equivalent configuration—the positions of the slide bearing bush 50 with a shoulder 51 and of the cover 64 are reversed or arranged mirror-symmetrically with respect to the annular body 38. In this case, the cover 64 forms an insert 100, which is inserted into the hydraulic casing 42 from the outside. In this case, the base section 66 of the insert 100 replaces the sliding bearing bush 50 in accordance with the other embodiments and on the radially inner side accommodates the guide bush 35 on that side of the piston 39 which faces into the interior of the toroidal transmission, and on the radially outer side rests in the hydraulic casing 42. The connecting leg 90 of the insert 100 is supported in the region of an outwardly facing annular shoulder 101 of the hydraulic casing 42 and on the radially outer side of the shoulder 101 forms the annular passage 61 with the hydraulic casing 42. The base limb 65 delimits the working spaces 48, 49 on the radially outer side, while on the radially inner side it forms the first contact area 95 with the piston 39 and is inserted into the bore 46 from the hydraulic casing 42 with a sealing action.

In the embodiments illustrated in FIGS. 6 and 7, the working space 48 is closed by a cover 102. In the partial longitudinal sections illustrated, the cover is L-shaped, with the base section formed with the slide bearing bush 50 and the side leg formed with the shoulder 51. Compared to the embodiments described above, the shoulder 51 is enlarged in the radial direction by an annular body which, in a contact region 103 with a lateral surface, bears against the inner surface of the base section 65 of the insert 100, so as to form a seal.

The cover 102 is secured, in the direction away from the roller along the axis X-X, by a securing element 73, in particular with an axial play fitted in between, and this securing element is accommodated in the base section 65. The slide bearing bush 50 and the guide bush 35 are sealed as a result of a sealing element being fitted in between. Alternative or additional fixing of the insert 100 with respect to the hydraulic casing 42 can be provided in the region of the shoulder 101 by means of a bolt 104. Preferably, a sealing element, for example a flat gasket, is arranged between the shoulder 101 and the area of the connecting limb 90 which bears against it.

In accordance with the exemplary embodiment illustrated in FIG. 7, the hydraulic casing 42 has a radial recess 110. After the insert 100 has been inserted into the hydraulic casing 42, it can be rolled or expanded into place in an area of the base section 65, in such a manner that a part of the base section 65 of the insert 100 enters the recess 104 in the radially outward direction, so that the position of the insert 100 is secured. It is preferable for the region of the recess 104 to coincide with a passage for supplying a pressure medium, so that there is no need to form an additional recess 104. As an alternative or in addition, the insert 100 is pressed into the hydraulic casing by means of a press fit.

The hydraulic casing 42 may be designed as an integral component of a transmission gear casing which is present in any case, or alternatively may be designed as a piston plate formed separately from the casing. An additional slide plate in which a hydraulic slide is arranged may be formed as an independent component 105, as an integral part of a piston plate or of a gear casing. For details of the arrangement of the casing, piston plate and slide plate, reference is made to document DE 691 12 706 T2, which is hereby incorporated in the subject matter of the present application.

Figure 8:
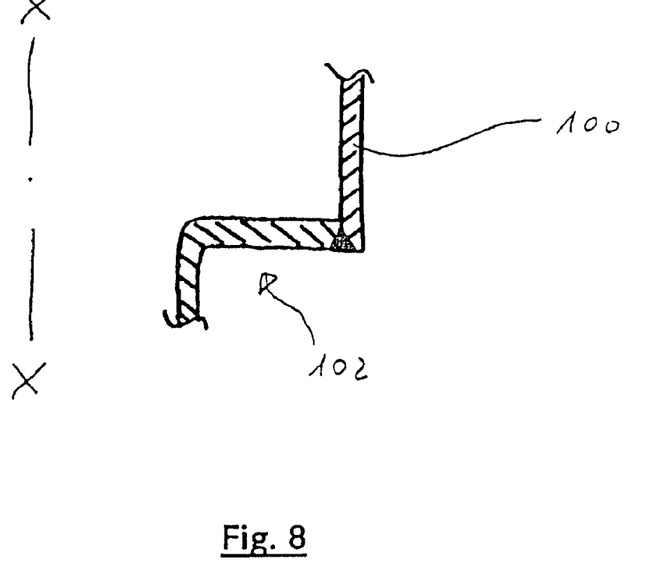
FIG. 8 shows a configuration of a joining region between a bush and a further bush in detail in the form of a partial section.

FIG. 8 shows the connection of an insert 100 to a cover 102 by way of a weld seam which extends all the way around in the circumferential direction and is applied from the side remote from the roller 11. The weld connection is provided in particular for an insert 100 which has already been fitted in the housing 42.

Alternatively, it is conceivable for the piston 100 together with the cover 102 and insert 100 to be connected to one another to form a preassembled or prefabricated assembly unit which can be inserted into the casing 42. The functioning and leak-tightness of this module can be tested using pressurized oil before it is fitted into the hydraulic casing 42.

Figure 9:
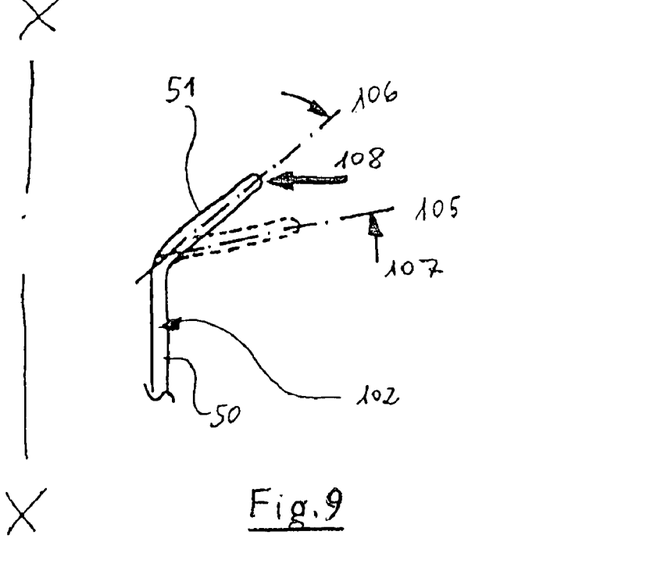
FIG. 9 shows a configuration of a further bush in detail and in the form of a partial section.

In the exemplary embodiment illustrated in FIG. 9, the cover 102 in the un-deformed state 105 is illustrated by dashed lines. The shoulder 51 is bent over by angle 107 into the position 106 in the direction of the axis X-X as a result of elastic deformation and inserted into the bore 46 in the hydraulic casing 42 or into the insert 100. In the insert 100, the cover 102 abuts the radially outer end region with the force 108, with the result that the position of the cover 102 is secured and/or a seal is formed between cover 102 and insert 100.

The hydraulic casing 42 is preferably formed integrally with the transmission casing. Alternatively, the hydraulic casing may be formed separately from the latter, namely as an individual hydraulic plate for one piston 38 or a common hydraulic plate for a plurality of pistons 38.

Adjacent piston units of the same chamber of the transmission ratio control structure and/or of adjacent chambers are preferably arranged in one plane, with the carriers oriented approximately parallel. With regard to the cover 102, it is likewise possible for a common component, produced, for example, by stamping, to include two or more covers 102 for one or more chambers of the adjustment structure. Furthermore, it is preferable to provide an additional slide plate which provides the required pressure in the working spaces 48, 49 by means of control slides, for example. This slide plate may in each case be formed separately for each piston unit or may take the form of a common slide plate for two or more pistons. In particular, at least one cover 102 is formed integrally with a slide plate of this type.

What is claimed is:

1. A toroidal transmission including a support member (12) rotatably supporting a power transmission roller (11) being supported at at least one bearing location (91, 92), by support levers (26, 27) so as to be pivotable about an axis X-X and displaceable in the direction of the axis X-X, toric disks disposed opposite each other and in rolling contact with said power transmission roller (11), and an adjusting unit (93) for displacing said support member (12) in the direction of the axis X-X, said adjusting unit (93) having a piston (39) which is disposed in a bush (90) and is drive-connected to the support member (12) the piston (39) having a piston surface (40) to which a pressure medium can be applied from at least one working space (48), a bush (90) mounted in said casing and having a first contact region (95) with the piston (39), said support member (12) including a recess (97) in the area of which a second contact region (96) between the bush (90) and the piston (39) is formed, said bush (90) being supported such that it is immoveable in the direction of the axis X-X with respect to a hydraulic casing 42 and forms a boundary of a working space (48) in the area arranged between the first and second contact regions (95, 96).

2. The toroidal transmission as claimed in claim 1, wherein the bush is one of a cover (64) and an insert (100).

3. The toroidal transmission as claimed claim 1, wherein the working space (48) is arranged on the radially inner side of a recess (46) of the hydraulic casing (42) formed separately from the transmission casing.

4. The toroidal transmission as claimed in claim 3, wherein the bush (cover 64, insert 100) has a hollow-cylindrical collar (65), with a cylindrical inner surface which forms the first contact region (95) and a cylindrical outer surface which fits accurately into the recess which is in the form of a bore (46) extending into the hydraulic casing (42).

5. The toroidal transmission as claimed in claim 4, wherein the hollow cylindrical collar (65) has an approximately radially oriented passage (69), via which the pressure medium can be supplied to the working space (48), and sealing elements are mounted in front of, and behind, the passage (69) in the direction of the axis X-X, said sealing elements forming seals between the bore (46) in the hydraulic casing (42) and the collar (65).

6. The toroidal transmission as claimed in claim 1, wherein at least one of the support member (12) and a component connected to the support member (12) extends into the recess (97) of the bush (64, 100).

7. The toroidal transmission as claimed in claim 6, wherein said bush is accessible via said recess so as to permit at least partial adjustment, assembly and dismantling of the bush (64) through the recess (97) without the need for opening the working space (48).

8. The toroidal transmission as claimed in claim 1, wherein the bush (64, 100) has a cylindrical inner surface which forms a slide surface for the radially outer surface of a guide bush (35) which moves with the piston (38).

9. The toroidal transmission as claimed in claim 8, wherein the bush (64) has two parallel base sections (65, 66) which each form a contact region (95, 96).

10. The toroidal transmission as claimed in claim 9, wherein the bush (64) is of Z-shaped design in a half longitudinal section, with a contact area (95, 96) being formed in each case by each of the two parallel base sections (65, 66).

11. The toroidal transmission as claimed in claim 1, wherein the installation position of the bush (64) is secured in the direction of the axis X-X by at least one securing ring (72, 73).

12. The toroidal transmission as claimed in claim 1, wherein at least one contact region (95, 96) of the bush serves as a slide surface of a seal ring.

13. The toroidal transmission as claimed in claim 1, wherein a circumferential groove (36) for receiving a sealing element extends into at least one contact region (95, 96).

14. The toroidal transmission as claimed in claim 1, wherein opposite active piston surfaces (40, 41) have surface areas of approximately equal size.

15. The toroidal transmission as claimed in claim 1, wherein the support member (12) is supported at two bearing locations (91, 92) in such a manner that it is displaceable in the direction of an axis X-X and can pivot about the axis X-X and the roller (11) is mounted opposite the support member (12) between the bearing locations (91, 92).

16. The toroidal transmission as claimed in claim (8), wherein the working spaces are delimited by the piston (39) and a bush insert (100).

17. The toroidal transmission as claimed in claim 16, wherein the bush insert (100) and a further cover bush are welded to one another.

18. The toroidal transmission as claimed in claim 16, wherein the axial position of the bush insert (100) is secured by means of a securing ring (73) which is supported against the component fixed to the transmission casing or the transmission casing (transmission casing or hydraulic casing 42).

19. The toroidal transmission as claimed in claim 17, wherein the cover bush (102), in partial longitudinal section, is of substantially L-shaped design, including a first section (50) forming a contact region between one of the further cover bush (102) and the piston (39) and the cover bush (102) and parts which move with the piston (guide bush 35), a second section (51), delimiting a working space (48, 49), said second section (51), in the end region remote from the first limb, adjoining the bush insert (100).

20. The toroidal transmission as claimed in claim 1, wherein the position of the bush insert (100) with respect to the component fixed to the hydraulic casing 42) is secured by one of a crimped-in and an outwardly bent structure.

21. The toroidal transmission as claimed in claim 1, wherein the bush insert (100) has at least one opening (69), which is in communication with passages (67) for supplying at least one working space (48, 49) with a pressure medium, and the opening (69) has a contour such that it forms a throttle for fluid flowing through the passages (67).

22. The toroidal transmission as claimed in claim 21, wherein the opening (69) comprises a bore with a diameter of between 0.8 mm and 2.5 mm.

23. The toroidal transmission as claimed in claim 1, wherein the area arranged between the contact regions (95, 96) is securely held to the component fixed to the hydraulic casing (42) by way of a securing means (104).

24. The toroidal transmission as claimed in claim 23, wherein, in the region of the securing means (104), a seal is arranged between at least one of the securing means (104), the bush insert (100) and the component fixed to the hydraulic casing (42).

25. The toroidal transmission as claimed in claim 17, wherein the cover bush (102) is inserted under radial prestress into the component fixed to the casing or the casing (gear casing or hydraulic casing 42) hydraulic casing (42).

* * * * *